April 30, 1929.  W. B. BRONANDER ET AL  1,710,689
CANDY PACKAGING MACHINE
Filed July 14, 1927  7 Sheets-Sheet 4

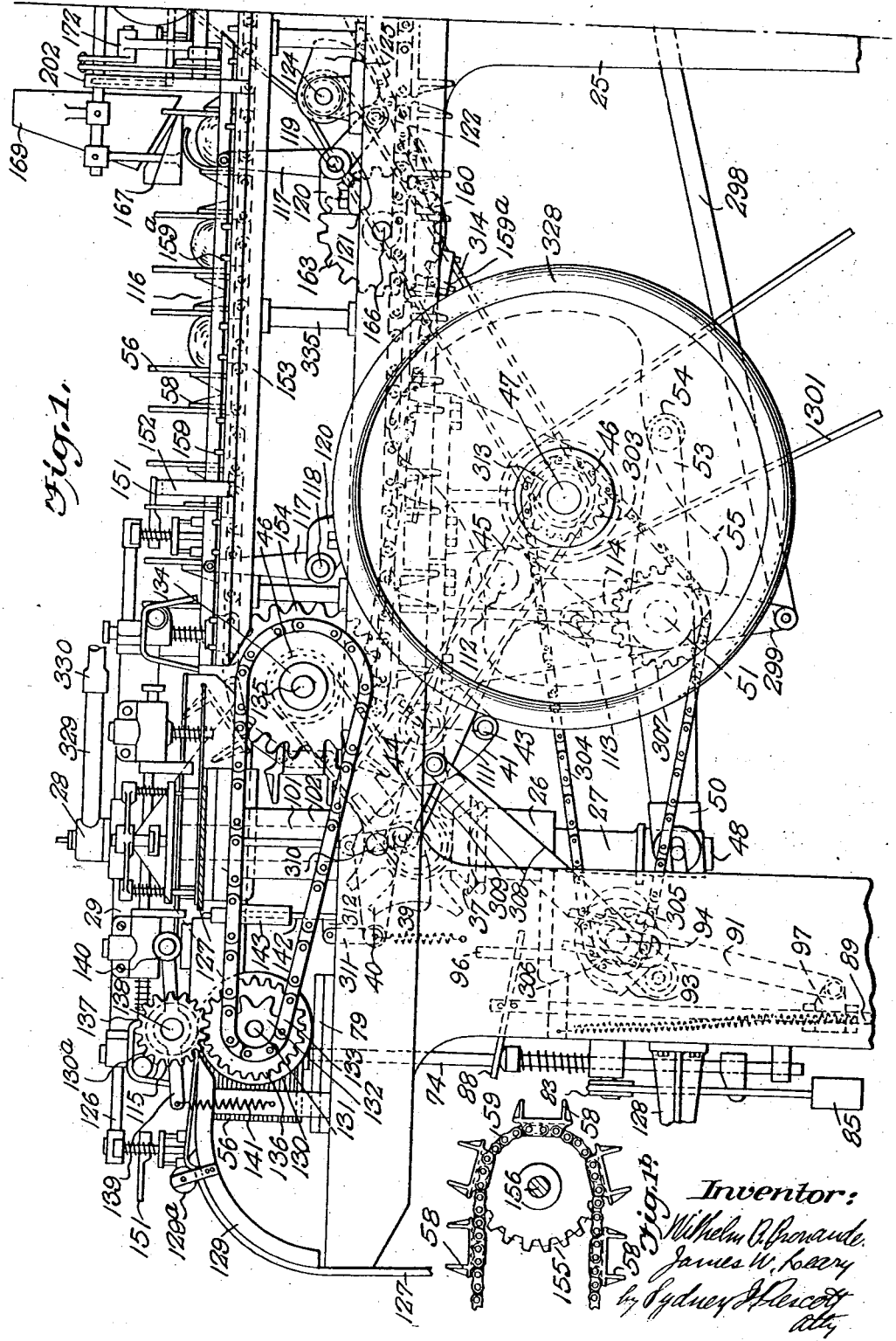

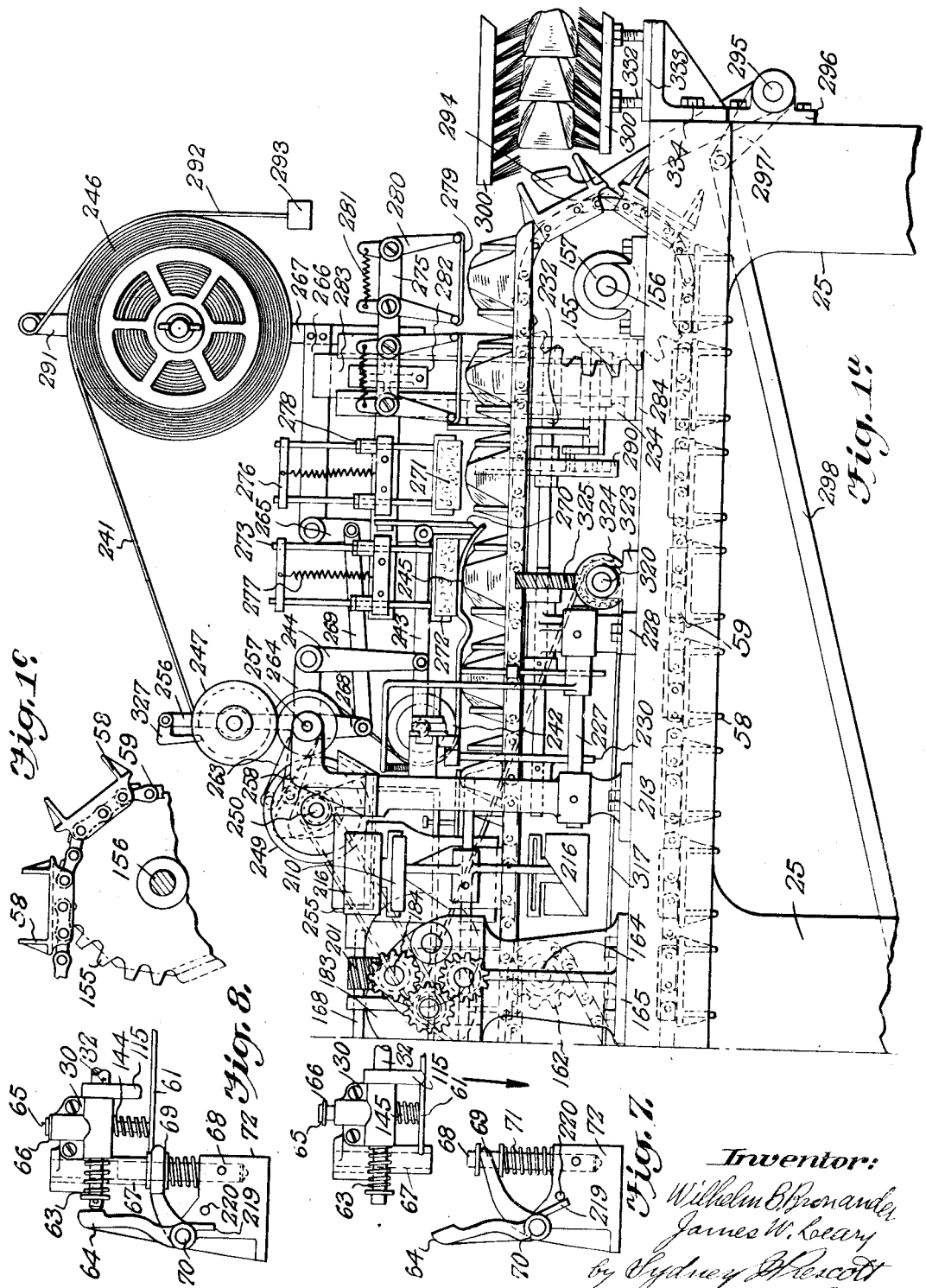

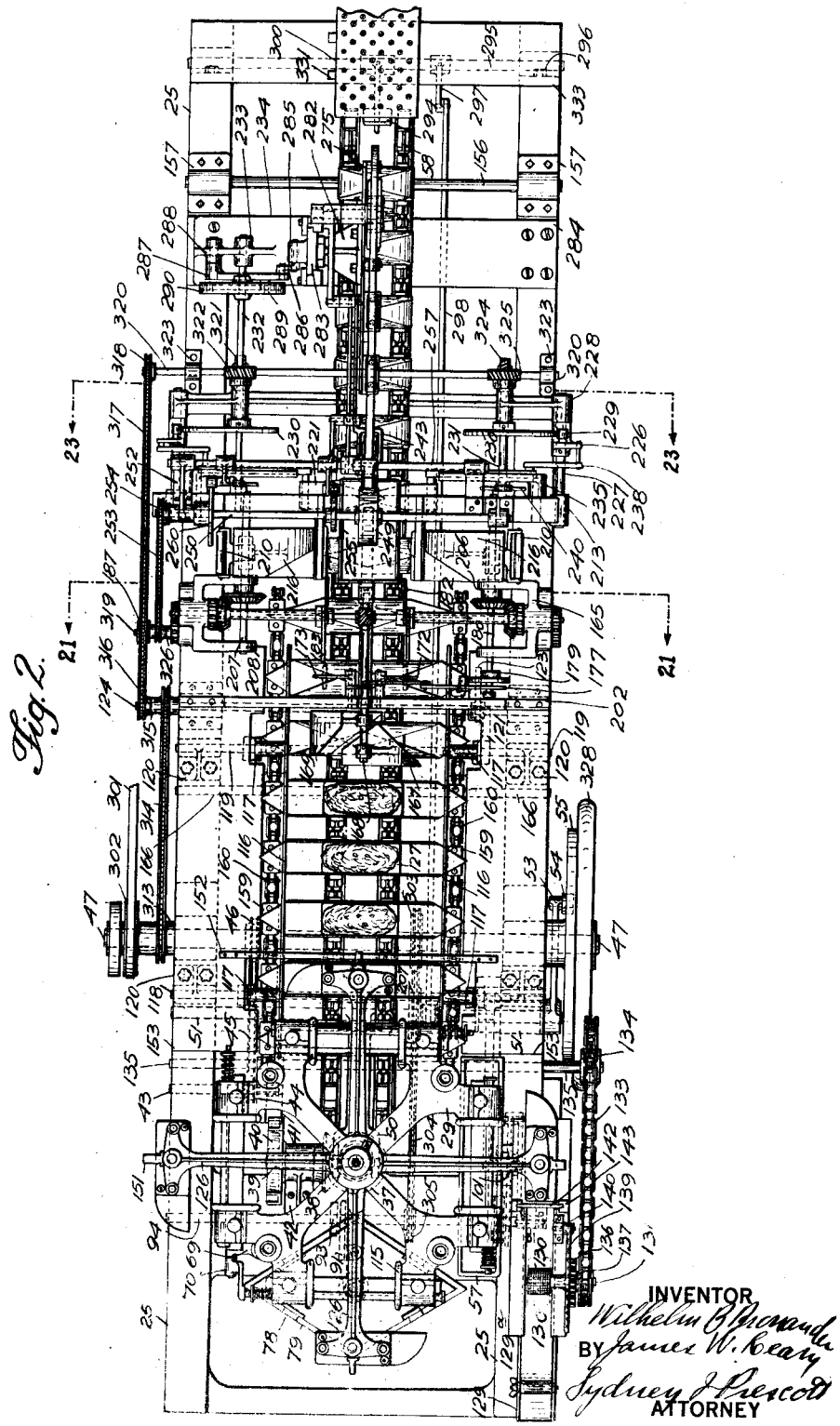

INVENTOR
Wilhelm B. Bronander
James W. Leary
BY
Sydney J. Prescott
ATTORNEY

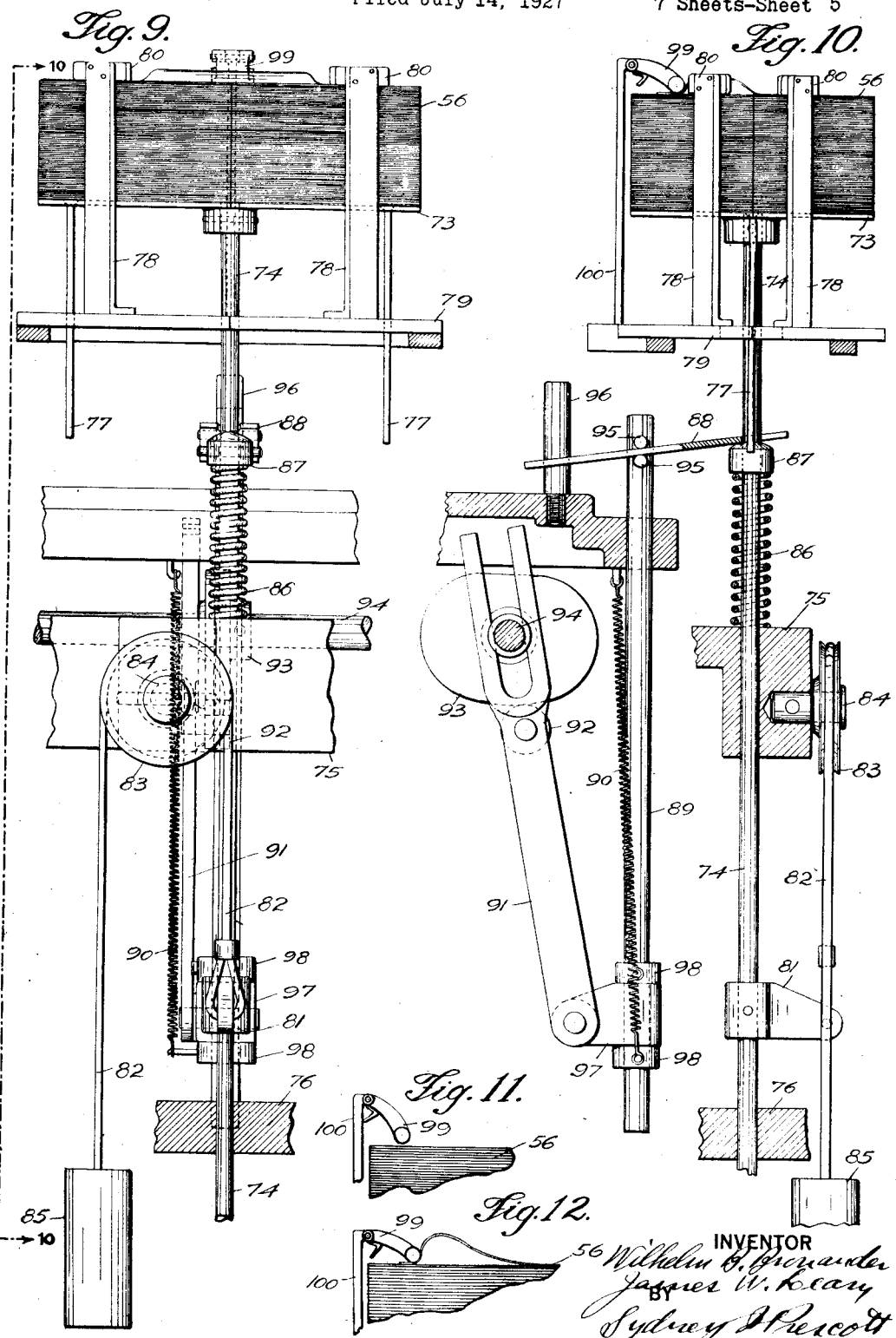

April 30, 1929.  W. B. BRONANDER ET AL  1,710,689
CANDY PACKAGING MACHINE
Filed July 14, 1927  7 Sheets-Sheet 6
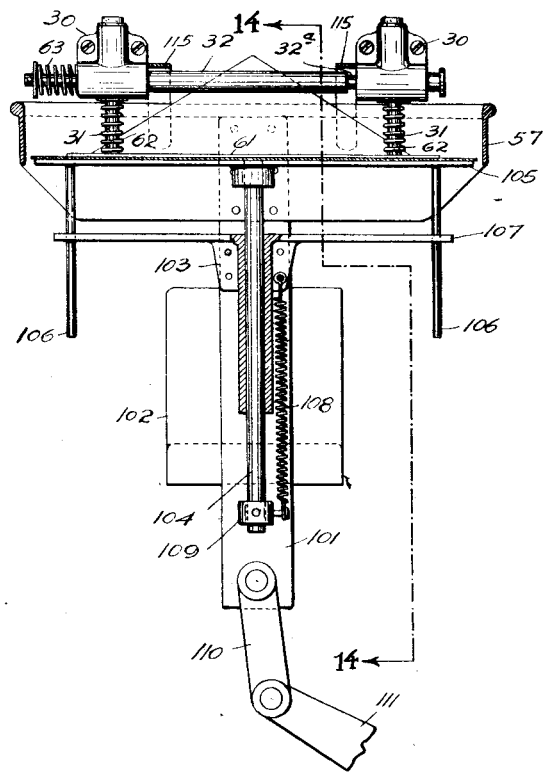
Fig. 13.
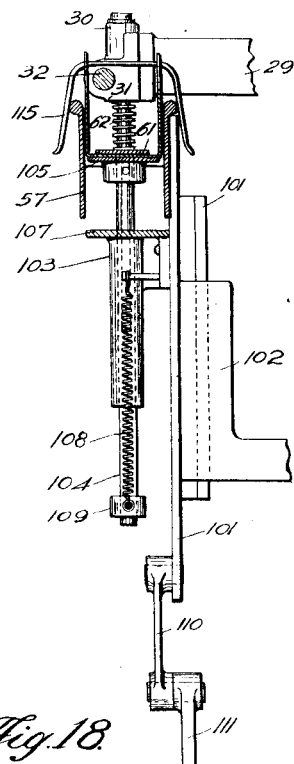
Fig. 14.
Fig. 15.
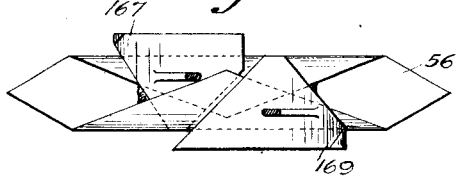
Fig. 18.
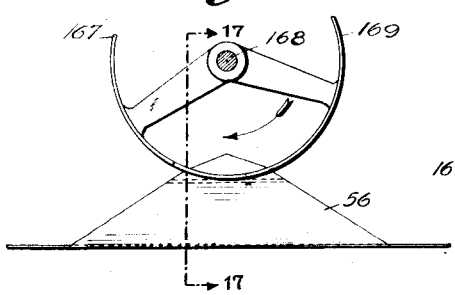
Fig. 16. Fig. 17.
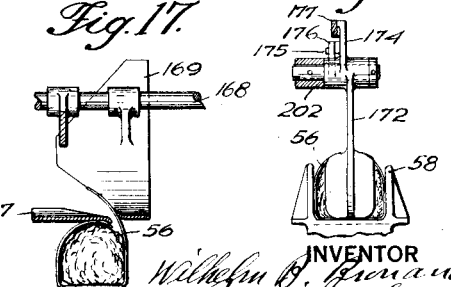
Fig. 19.
INVENTOR
Wilhelm B. Bronander
James W. Leary
BY
Sydney J. Prescott
ATTORNEY

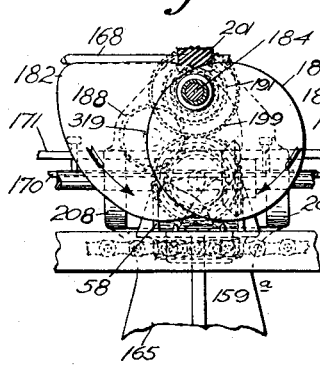
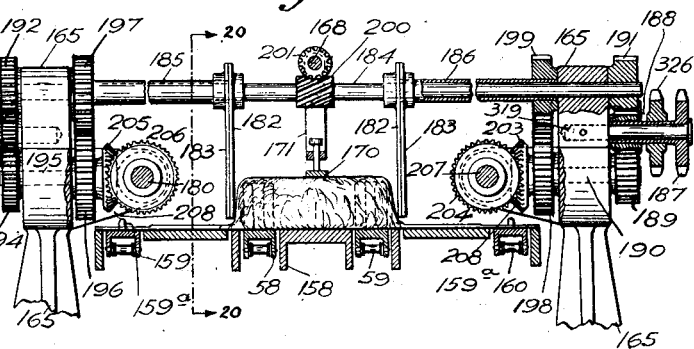
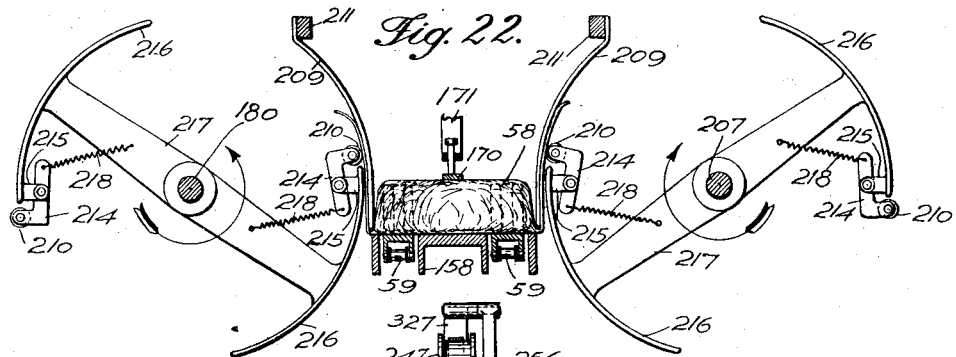
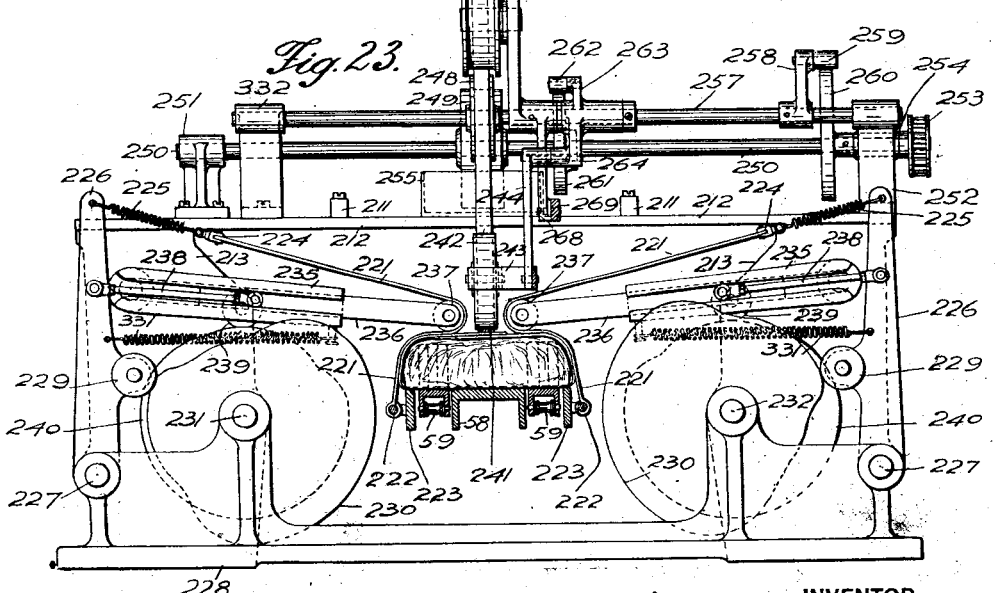

Patented Apr. 30, 1929.

1,710,689

UNITED STATES PATENT OFFICE.

WILHELM B. BRONANDER, OF MONTCLAIR, AND JAMES W. LEARY, OF BLOOMFIELD, NEW JERSEY, ASSIGNORS TO AMERICAN MACHINE & FOUNDRY COMPANY, A CORPORATION OF NEW JERSEY.

CANDY-PACKAGING MACHINE.

Application filed July 14, 1927. Serial No. 205,595.

This invention relates to a candy packaging machine, particularly designed and adapted to produce packages embracing irregularly shaped candy bars such as those known as "Baby Ruth".

In Letters Patent of the United States, No. 1,637,802, granted to us August 2, 1927, there is disclosed such a package and a method of making it. The main object of the present invention is the production of a machine for rapidly and economically making packages of the type disclosed in the patent by the method disclosed therein.

With this and other objects not specifically mentioned in view, the invention consists in certain constructions and combinations which will be hereinafter fully described and then specifically set forth in the claims hereunto appended.

Figure 3:
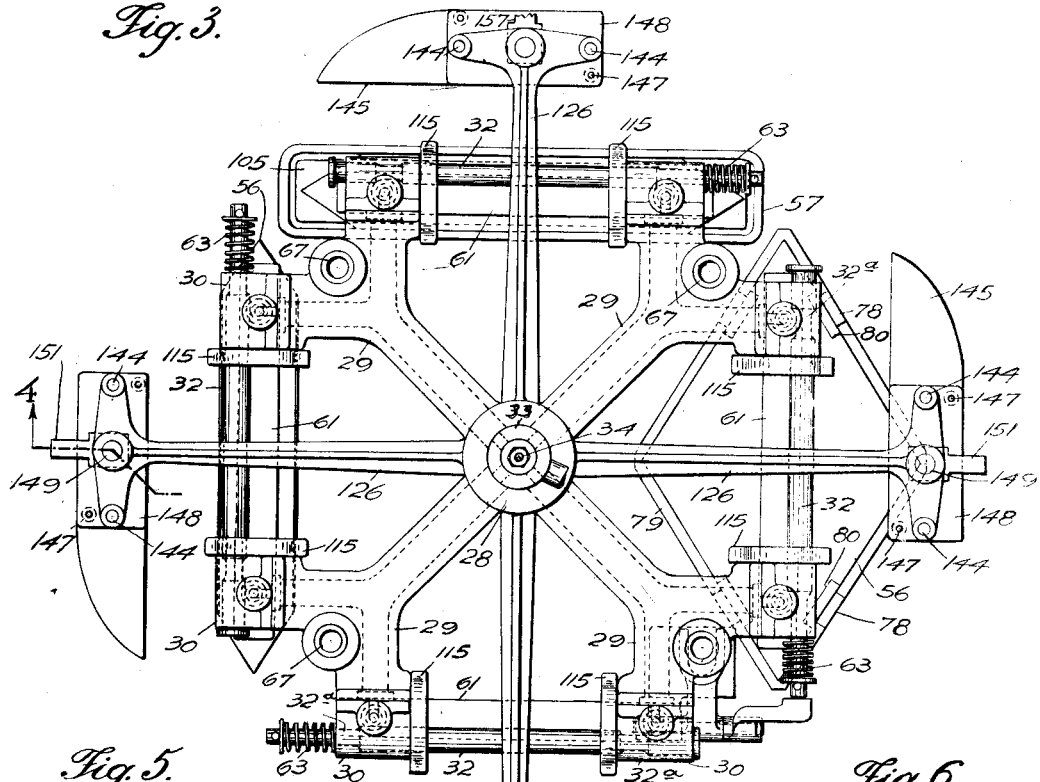
Figure 5:
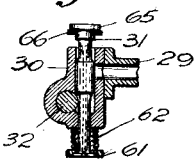
Figure 6:
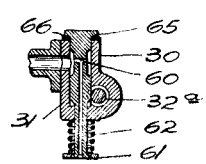
Figure 4:
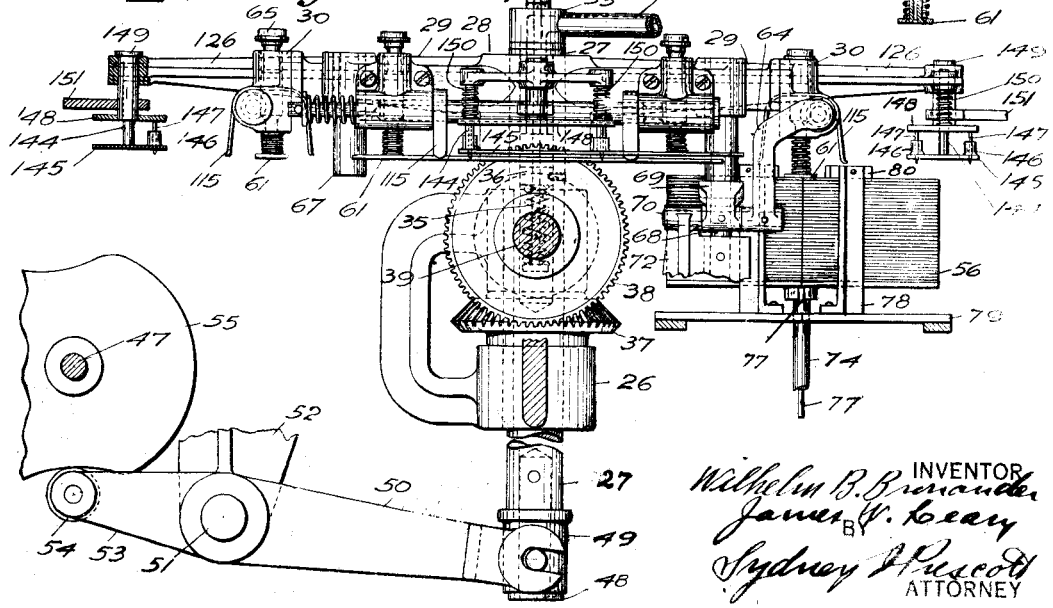

In the accompanying drawings, in which like characters of reference indicate the same or like parts, Figs. 1 and 1ª are partial side elevations which if joined show a machine constructed in accordance with the invention; Figs. 1ᵇ and 1ᶜ are details of the conveyor chain and driving sprocket; Fig. 2 is a plan view of the machine shown in Fig. 1; Fig. 3 is a plan view of the wrapper and card feeding mechanism; Fig. 4 is a side elevation of the same; Fig. 5 is a cross-sectional view of one of the suction arms of the turret, showing the suction plunger in its closing position; Fig. 6 is a cross-sectional view of one of the suction arms of the turret, showing the suction plunger in its opening position; Fig. 7 is an elevation of the automatic locking device for the turret, shown in unlocked position; Fig. 8 is an elevation of the same, shown in locked position; Fig. 9 is an elevation of the wrapper magazine; Fig. 10 is a side elevation of the same, shown partly in section; Figs. 11 and 12 are detail views showing the action of the device for separating the uppermost wrapper from the stack in the magazine; Fig. 13 is a side elevation of the device employed for giving trough form to the wrappers before assembly with candy bars or other articles; Fig. 14 is an end elevation partly in section, of the same; Figs. 15, 16 and 17 are detail views of the device employed for folding diagonally opposite corners of the wrapper in superposed condition on an article; Figs. 18 and 19 are detail views of the device employed for centering the article in its partially folded wrapper; Figs. 20 and 21 are detail views, partly in section, of the devices employed for folding the wrappers down on the ends of the articles; Fig. 22 is a side elevation of the devices employed for folding upwardly the diagonally opposite side corners of the wrappers; and Fig. 23 is a side elevation of the devices employed for folding the upstanding side corners of the wrappers down on the top of the articles, and also of the feeding mechanism for the sealing strip for holding all four corners of the wrapper firmly in position.

In carrying the invention into effect, there are provided means for supporting a wrapper and an article to be wrapped therein, and means for placing a wrapper in said supporting means with two diagonally opposite corners upstanding and with two diagonally opposite corners outstanding, or, in other words, in trough-like formation ready to receive the candy bars, and means for folding the wrapper about the article with its corners superposed. In the best constructions contemplated, the supporting means is in the form of a conveyor having a series of supporting pockets, a magazine for the wrappers is provided from which the wrappers are successively transferred to the pockets of the conveyor, means for assembling stiffening or advertising cards with the wrappers in the pockets are provided, sealing means for fastening the superposed corners of the wrappers are provided, and means for centering the articles in the wrappers after a preliminary wrapper fold has been made are provided. All of the above mentioned parts may be widely varied in construction within the scope of the claims, for the specific structure selected to illustrate the invention is but one of many possible concrete embodiments of the same. The invention, therefore, is not to be restricted to the precise details of the structure shown and described.

The specific machine selected to illustrate the invention is provided with a wrapper magazine in which rhombic or similar wrappers are stacked and from which the wrappers are successively withdrawn by a turret having suction devices for this purpose, folding devices for giving the wrappers troughlike form, and ejecting devices for placing the trough-like wrappers in the pockets of a conveyor which carries the wrappers with the articles through the several folding devices and the sealing device and finally discharges the finished packages.

The articles to be wrapped are manually placed on the mid-sections of the wrappers placed in trough-like formation in the pockets of the conveyor with diagonally opposite corners upstanding and with diagonally opposite corners outstanding, and hereinafter the first mentioned corners will be referred to as the leading and trailing corners, and the second mentioned corners will be referred to as the side corners. In packaging the so-called "Baby Ruth" candy bars, the leading and trailing corners of the rhombic wrapper are obtuse corners, while the side corners are acute corners; but in packaging other articles, the reverse might be true, without, however, affecting the operation of the machine.

After an article has been placed on a wrapper in a conveyor pocket, the conveyor moves both into the range of action of a folding device which first folds the trailing corner of the wrapper down on the article and immediately thereafter folds the leading corner down on the article over the corner first folded down. As the conveyor then moves ahead, the two corners are held in place by engagement of the upper one with a retaining bar which prevents it from springing back away from the article. At the next folding station along the path of the conveyor, the partially wrapped article is centered in its wrapper longitudinally, in order to insure the proper superposed arangement of the corners of the wrapper which is effected later on. Then, the protruding parts of the wrapper are folded down on the ends of the article in order to provide for a neat bend which occurs next and in which the previously outstanding side corners of the wrapper are bent upwardly into upstanding position ready to be folded down on the top of the article, an operation which next occurs, at another folding station.

When the wrapper is completely folded about the article with its four corners superposed on the top of the package, a strip of adhesive sealing material is drawn from a reel and applied to the wrapper where its corners are superposed, and cut off to the proper length. A succession of pressing devices then come into action and hold the sealing strip firmly against the wrapper until the adhesive dries and the union is permanent.

When it is desired to insert a piece of cardboard in each package, either for advertising purposes or for stiffening the package, the wrapper feeding turret is provided with devices for feeding such cards to the pockets of the conveyor. The machine selected to illustrate the invention has such devices.

Referring to the drawings: The machine is provided with a frame 25 carrying a turret bearing 26 in which is slidably mounted and rotatably mounted a vertical turret shaft 27 carrying a turret 28. The turret 28 has hollow suction arms 29 provided with suction heads 30 in which are slidably mounted plungers 31 and lock rods 32. The upper part of the turret shaft is hollow and carries on its upper end a suction fitting 33 held air-tightly on a fulcrum rod 34 by a spring 35 resting on a collar fastened to the turret shaft 27. To the latter is slidably keyed a bevel gear 37 driven by a bevel gear 38 mounted on a shaft 39 to which is also secured a Geneva gear 40 driven by a two-arm crank 41 and turning the turret 28 one step in every half revolution. The shaft 39 is mounted in a bearing bracket 42 supported by the frame 25 before referred to. The crank 41 is mounted on a shaft 43 to which is also fastened a sprocket 44 driven by a chain 45 from a sprocket 46 on the main drive shaft 47 which is journaled in bearings in the frame 25.

The turret shaft 27, at its lower end, has a stud 48 carrying a lift 49 operated by a lever 50 mounted on a shaft 51 supported by bearing brackets 52 attached to the frame 25. The shaft 51 carries a cam arm 53 operated by a roller 54 from a cam 55 on the shaft 47, the cam 55 swinging the lift 50 up and down, thereby raising and lowering the turret 28. The latter turns one-quarter of a revolution at a time in its raised position, and then descends to its lower position in which three of its arms operate simultaneously. One arm picks up a wrapper from the magazine 56, the second pushes the wrapper picked up at the preceding step into a former 57 which gives it its proper trough-like form, and the third delivers the previously formed wrapper into one of the pockets 58 of the conveyor 59, the fourth being empty and ready to pick up a wrapper in the next step.

The suction devices 31 for picking up the wrappers have a vertical bore with a horizontal port 60, as shown in Fig. 6. The lower ends of each pair of plungers are connected by a bar 61 against which bear springs 62 surrounding the protruding lower ends of the plungers, opening the suction ports 60 when released by the lock rods 32. The latter are held in locked position by the springs 63 and normally engage a shoulder of the plungers 31, thereby preventing them from moving downward, but have, adjacent the plungers, sections 32ᵃ of smaller diameter which, when pushed forward by an arm 64 into registration with the plungers, allow the shoulders to pass the lock rod. The plungers are provided with heads 65 having packing collars 66 insuring a sufficient vacuum while the wrapper is held on the suction device.

The turret 28 is provided with lock bushings 67, each located on one of the suction arms 29, as shown in Fig. 3. On the downward movement of the turret, the lock bushings engage lockpins 68 (Figs. 7 and 8) and thereby lock the turret. In descending farther, the lock bushing pushes down a forked lever 69 mounted on a shaft 70 to which is also fastened the arm 64, and, in so doing, the forked lever 69 compresses a spring 71. The shaft 70 is supported in a bearing bracket 72 fastened to the frame 25 and also carrying the lockpin 68. When the forked lever 69 is depressed by the descending turret, the arm 64 pushes against the lock rod 32, moving the release sections 32ᵃ under the plungers, thereby permitting the springs 62 to pull down the plungers and to open the suction ports. The arm 64 has an extension 219 which engages a stop pin 220 attached to a bracket 72, and thereby limits the back stroke of the arm 64 and the lever 69 and brings them to rest at the desired point after each up-stroke of the turret.

The wrappers are stacked on the magazine floor 73 (Figs. 9 and 10) mounted on a supporting rod 74 which slides in lugs 75 and 76 of the main frame; and in its up and down movement is prevented from turning by guide rods 77 attached to the floor 73, the wrappers being held in place by guide posts 78 attached to a supporting plate 79 secured to the frame 25. The guide posts 78 are provided with stop plates 80 so that the top of the stack always comes to rest at the same elevation. The rod 74 carries a lug 81 to which is fastened a cable or rope 82 running over a roller 83 on a stud 84 in the lug 75 and carrying a weight 85. Above the lug 75 and surrounding the rod 74 is a spring 86 carrying a slidable collar 87 upon which rests a gripper plate 88 which is operated by a rod 89 guided in the frame 25. The rod 89 is held by a tension spring 90 and is operated, through a cam link 91 and roller 92, from a cam 93 mounted on a shaft 94 journaled in the frame 25. The gripper plate 88 is swingably supported between two pins 95 on the rod 89 and guided by a stud 96. As the turret descends, the cam 93, through the roller 92 pushes down the link 91 which, through the lug 97 held between the adjustable collars 98, causes a downward movement of the rod 89. The gripper plate then acts as a lever pulling the rod 74 down. The top wrapper is then free of the stop plates 80 and can be lifted off by the suction devices 31. On the ascent of the turret, the cam 93 causes the rod 89 to rise, thereby releasing the grip of the plate 88 on the rod 74 and permitting the weight 85 to lift the rod 74 with the magazine floor 73 until the top wrapper bears against the stop plates 80.

In coming up, the top wrapper lifts a rubber lined finger 99 (Figs. 11 and 12), hinged to a rod 100 mounted on the supporting plate 79, the finger thereby pushing the top wrapper in the direction of its lateral movement and buckling it from the stack, permitting air to enter between them, thus breaking the vacuum and facilitating the pick up of the wrapper.

After taking a wrapper, the turret moves up, makes a quarter revolution, and goes down again, the wrapper picked up in the previous step being pushed into the form 57 which moves up as the turret descends. The form (Figs. 13 and 14) consists of a form frame 57 fastened to a slide 101 which moves up and down in a bracket 102 mounted on the frame 25. On the slide 101 is mounted a bracket 103 in which slides a rod 104 carrying a form plate 105 having guide pins 106 passing through holes of the top plate 107 of the bracket 103. The form plate 105 is held in raised position by a spring 108 fastened to a collar 109 on the rod 104. The slide 101 is connected by a link 110 to a bellcrank 111 pivoted on a shaft 112 (Fig. 1). The bellcrank 111, through a pin 113, engages a lever 114 mounted on the shaft 51 which receives rocking motion from the cam 55. As the turret brings down a wrapper, the slide 101 moves upward carrying with it the form 57 and plate 105. When the wrapper on the downgoing suction device 31 meets the up-going form plate 105, the form plate 105 is pushed back into the form frame 57 which continues to move upwardly, thereby folding the sides of the wrapper over the edges of the form 57 and giving to the wrapper a trough-like form. The suction heads 30 are provided with fingers 115 (Figs. 3 and 4) which hold the wrapper folded on the next upward and downward movements of the turret 28, during which time the folded wrapper is transferred into a pocket 58 of the conveyor 59. The conveyor is placed at such an elevation that the plungers 31 with the wrapper reach the bottom of the pocket before the turret has come to the end of its down stroke, thereby causing an upward movement of the plunger in the suction head and stopping the suction in that arm, whereupon the spring 63 locks the plunger by means of the rod 32.

The bars 116 (Figs. 1 and 2) which strip off a wrapper as it is transferred into a conveyor pocket and guide it while being conveyed to the folding mechanism are operated from levers 117 mounted on shafts 118 and 119 supported in bearing brackets 120 fastened to the frame 25. On the shaft 119 is mounted a cam lever 121 which, through a roller 122, is actuated by a cam 123 mounted on a shaft 124 supported by a bracket 125 on the frame 25. The bars 116 swing out of the way of the turret when the latter descends to deliver a wrapper, slide over the ends of the wrapper before the turret starts to rise, and then travels with the conveyor until a new wrapper is delivered into the next pocket.

For inserting stiffening or advertising cards into the packages, the turret is provided with arms 126 (Figs. 1, 2, 3 and 4) which carry attachments for placing a card 127 upon each wrapper. Cards are stored on a reel, not shown, mounted on a bracket 128 extending from the base of the machine, and are pulled over a guide 129 by rollers 130 and 130$^a$. The roller 130 is mounted on a shaft 131 which is driven by a sprocket 132 and chain 133 from a sprocket 134 mounted on the conveyor shaft 135 journaled in the frame 25. On the shaft 131 is mounted a gear 136 meshing with a gear 137 on a shaft 138 which carries a roller 130$^a$. The shaft 138 is mounted in a lever 139 which is pivoted on a bracket 140 and held in tension by a spring 141. The card, before being cut, passes over a small hump on the guide 129 while an adjustable roller 129$^a$ bears against it, thereby taking out its curl from being rolled on the reel. A knife 142, supported in a bracket 143 and having an up and down motion, cuts the card material into the required lengths. Each arm 126 carries two guide rods 144 holding at their ends a plate 145 having vertical guide bearings 146 for impaling needles 147. The latter are carried by a plate 148 mounted on the end of a lifter rod 149 which is slidably mounted in a bearing on the arm 126 and forced downward by springs 150 surrounding the guide rods 144. When the turret descends, the needles 147 impale and pick up a card, and, in the next step of the turret, transfer the card into the pocket of the conveyor which in the preceding step received a wrapper. In the downward movement of the turret, the lifter arm 151 of the rod 149 engages a stop bridge 152 resting on an operating table 153 and spanning the conveyor, thereby lifting the picker plate 148 and stripping the card from the needles 147 by the stripper plate 145.

The conveyor chains run over sprockets 154 mounted on the conveyor drive shaft 135, and over sprockets 155 fastened to a shaft 156 supported in bearing brackets 157 on the frame 25.

In Fig. 1$^c$ is shown a detail of the sprocket and chain arrangement for the conveyor, the teeth of the sprockets 154 and 155 being cut on a polygon instead of on a circle, so that the pockets 58 can be fastened across two or more links of the chains, thereby holding them much more firmly than would be possible by attaching them in the usual manner to only one link. The pockets may span any number of links and may be set any distance apart provided the sprocket teeth are cut accordingly. Each tooth arrangement can be used for a number of different pocket spacings; thus, while in Figs. 1 and 1$^a$ there is only the length of two links between adjacent pockets, the latter are set four links apart in Fig. 1$^b$, the sprockets being identical in both cases.

While the packages remain in the conveyor, they are supported by an inverted U-shaped rail fastened to the frame 25, and the outstanding side corners of the wrapper, until folded up, are supported by guide shoes 159 fastened to endless chains 160 running parallel with the conveyor chains. The guide shoes 159 have upwardly projecting pins 159$^a$ which hold the wrappers in position in the pockets. The chains 160 are driven by sprockets 161 on the shaft 135 and run over sprockets 162 and idlers 163. The sprockets 162 are mounted on a shaft 164 supported in the folder bearing brackets 165, and the idlers 163 are carried by a shaft 166 in the frame 25.

After passing between the operating table 153 from which the articles to be wrapped are fed upon the wrappers in the pockets 58 by a manual operation, the package on the conveyor next moves under the rotary folding segment 167 (Figs. 15, 16 and 17) which is mounted on a shaft 168 and folds the upstanding trailing corner of the wrapper down on the article. The shaft 168 is supported by a bearing bridge 202 and by a bracket attached to a water receptacle 255. Another curved and rotating segment 169, also mounted on the shaft 168, then engages the leading upstanding corner of the wrapper and lays it down gradually over the first folded corner, and holds it down during the advance of the package until the now superposed corners come under and are held down by a gravity-actuated retaining bar 17$^e$ suspended from a supporting bar 171 mounted on the frame of the machine.

At the end of the next step of the conveyor, the article within the wrapper and partially enclosed therein is centered by a pair of fingers 172 and 173 (Figs. 18 and 19) which are interconnected and enter the package through the open ends of the wrapper. The centering fingers 172 and 173 are pivoted on a bearing bridge 202. The finger 172 has a rear extension 174 carrying a pin 175 which engages a slot in a rear extension 176 of the finger 173. To the extension 174 is pivoted a cam link 177 having a roller 178 engaging a cam 179 mounted on a shaft 180. The cam link 177 is provided with a fork 181 acting as a guide and bearing for the same. As the roller 178 follows the contour of the cam 179, the link 177, through the extensions 174 and 176, actuates the centering fingers 172 and 173, closing and opening the latter, thereby centering the article if off center.

At the next step of the conveyor, two pairs of eccentrically mounted rotary members or discs 182 and 183 (Figs. 20 and 21) turning against each other or in opposite directions, close the ends of the package by folding the outstanding wrapper down on the ends of the article. The discs 182 are mounted on a shaft 184 supported in bearing brackets 165, and the discs 183 are attached to sleeves 185 and 186 turning on the shaft 184. The discs 182 and 183 are driven from a sprocket 187 having long hub forming a sleeve on a stud 319 attached to the bearing bracket 165. The hub of the sprocket 187 carries a gear 188 which meshes with a gear 189 on a shaft 190 in the bearing bracket 165, and also a gear 191 mounted on the right hand end of the shaft 184. On its left hand end, the shaft 184 carries a gear 192 which, through an intermediate gear 193, drives a gear 194 on a shaft 195. The latter carries a gear 196 meshing with a gear 197 mounted on the sleeve 185. On the shaft 190 is also a gear 198 which drives a gear 199 on the sleeve 186. The shaft 184 carries a spiral gear 200 meshing with a spiral gear 201 on the shaft 168 which carries the folding segments 167 and 169. The shaft 190, on its inner end, has a bevel gear 203 which meshes with a bevel gear 204 and thereby drives a shaft 207. Likewise, the shaft 195 has a bevel gear 205 meshing with a bevel gear 206 on the shaft 180, thereby driving the latter. The shafts 180 and 207 are supported in arms 208 of the bearing bracket 165. While the discs 183 which revolve towards the package, are circular in shape, the discs 182 which revolve with the package, have an elongated form, the tail part of the disc being of such shape as to keep in engagement with the folds of the wrapper and hold them down until the package has passed to its next position.

At the next step of the conveyors, the outstanding side corners of the wrapper, while being guided by two stationary curved plates 209, are folded upwardly against said plates by rollers 210 (Fig. 22). The plates 209, which are slightly wider than the conveyor pockets, are fastened to bars 211 mounted on a bridge bar 212 supported by bearing stands 213, as seen in Fig. 23. The folding rollers 210 are carried in forked bearings 214 pivoted on lugs 215 of the curved folder plates 216, the latter being attached to arms 217 rotating on shafts 180 and 207. The rollers 210 press the wrapper against the plates 209 by means of springs 218 secured to the arms 217. The folders turn in the direction of the arrows, making one-half of a revolution for each package. The folding segments 216 hold the upfolded ends of the wrapper against the plates 209 while the package is being advanced to the next conveyor station.

In the next operation, the now upstanding side corners of the wrapper are folded in overlapped condition over the previously overlapped trailing and leading corners on the top of the article. For this purpose, two flexible tapes 221 (Fig. 23) one at each end of the package, are fastened at one end to a rod 222 supported on the chain guard bar 223. The other end of each tape is held by a clamp 224 fastened to a tension spring 225 which is hinged to a cam lever 226 mounted on a shaft 227 supported by a bearing bracket 228. The cam levers 226 have rollers 229 engaging, by means of springs 331, cams 230, one of which is mounted on a shaft 231 and the other on a shaft 232, these shafts being journaled in a stand 213 and in the bracket 228. The shaft 232 is additionally supported in a bearing 233 in a stand 234. To the stands 213 are pivoted guide rails 235 in which are slidably supported bars 236 carrying at their ends the rollers 237. The bars 236 are connected with the cam levers 226 by means of rods 238, and the guide rails 235 have cam rollers 239 engaging cams 240 on the shafts 231 and 232. Through the cam levers 226, the slide bars 236 move the flexible tapes 221 to and from the package or in and out of operative position, and through the rollers 239, the bars 236 move the tapes 221 up and down, the combined action of the cams 230 and 240 pressing the tapes against the ends and over the top of the package, thereby making the overlap of the side corners.

While still being held in position by the flexible tapes 221, the superposed corners of the wrapper are served with a strip 241 of gummed paper or the like which is pressed onto the package by a roller 242 supported in a forked lever 243 pivoted on a lever 244. When the roller 242 with its gummed strip 241 rests on the package, the flexible tapes 221 are withdrawn and the package is moved ahead, the presser roller traveling with and remaining on the package for one step of the conveyor movement. The end of the gummed strip 241 in the meantime is held by a cushion 245 pressing it down on the preceding package, and when the new package takes the place of the former under the cushion, so holding the strip, a cam lifts the roller 242 from the package and holds it in raised position while another cam brings it back again to its starting point.

From the reel 246, the sealing strip, after passing over an idler 247, runs over a felt-lined moistening roller 248 which receives its moisture from a roller 249 mounted on a shaft 250 supported in bearing brackets 251 and 252 mounted on the bridge bar 212. The shaft 250, through a chain 253, is driven by a sprocket 254, the roller 249 running in a water receptacle 255 mounted on the bridge bar 212. The roller 247 is pivoted to an arm 256 mounted on a shaft 257 which receives rocking motion from a cam lever 258 having a roller 259 in engagement with a cam 260 mounted on the shaft 250. The latter also carries a cam 261 actuating a roller 262 on a cam lever 263 which turns freely on the shaft 257. To the cam lever 263 is fastened a lever 264 to which is pivoted the lever 244 connected to the forked lever 243 carrying the presser roller 242. The forked lever 243 is swingably supported on a lever 265 pivoted on an arm 266 mounted on a bracket 267. The arm 266 has a lever 268 which, through a connecting rod 269, is connected with a supporting lever 265. The cam 260 pushes the presser roller 242 forward, while the cam 261 raises it for rearward movement.

The cushion 245 which holds the gummed strip 241 while it is being cut by the knife 270, and the cushion 271 which presses down on the strip at the next step of the conveyor, are mounted in shells 272 (Fig. 1) held by vertical rods 273 which slide in bearings 274 mounted on a crossbar 275. The upper ends of the rods 273 are connected together by bars 276 which are attached by springs 277 to the crossbar 275. Stop collars 278 prevent the rods 273 from sliding down too far. The strip cutting knife 270 is attached to the crossbar 275, as are also the flexible tapes 279 which in the last two steps of the sealing operation press down and seal the ends of the gummed strip 241 on the package. Each flexible tape 279 is held between two fingers 280 which are pivoted on the crossbar 275 and tensioned by springs 281.

The crossbar 275 is supported by a bracket 282 fastened to a slide 283 which is held in a guide block of the bearing stand 234 mounted on a crossplate 284. The slide 283 has a lug 285 which, through a link 286, is connected to a cam lever 287 pivoted to a lug 288 of the stand 234 and engaging, through a roller 289, a cam 290 mounted on the shaft 232. The cam 290, through the cam lever 287, imparts to the crossbar 275, and, with the latter, to the cushions 245 and 271, knife 270, and tapes 279, an up and down motion in synchronism with the step movement of the conveyor.

The reel 246 of the sealing strip 241 is supported by the bracket 267 supported on the bearing stand 234. The roller bracket 267 has an extension 291 to which is fastened a tape 292 which rests on the perimeter of the roll of sealing strip and carries a weight 293, thus acting as a friction brake for the unrolling strip.

After being sealed, the package is ejected from the conveyor by an arm 294 mounted on a shaft 295 which is supported by a bearing bracket 296 fastened to the frame 25. On the shaft 295 is fastened a crank 297 connected by a rod 298 to a crank 299 on the shaft 51 which is kept in rocking motion by the cam 55. The ejector arm 294 pushes the finished package between two horizontal brush-studded plates 300, the brushes holding the seal down smoothly while in the drying stage. The brush-studded plates are joined together by a strip 331 and are supported by studs 332 from a crossplate 333 carried by brackets 334 attached to the end of the frame 25. They are made of sufficient length to allow the package seal to thoroughly dry before final ejection from the machine.

The machine is driven from a belt 301 running over a main pulley 302 mounted on the drive shaft 47. A sprocket 303 on the shaft 47, through a chain 304 and sprocket 305, drives the shaft 94 carrying the cams 93 and 306. The chain 304 is held tight by an idler 307 turning loosely on the shaft 51. The cam 306, through a roller 307, actuates the cam lever 308 pivoted to one arm of a bellcrank 309 mounted on a shaft 310 supported in the frame 25. The other arm of the bellcrank 309 is connected, by a link 311, to a lug 312 of the card cutting knife 142, thereby operating the latter. On the shaft 47 is also mounted a sprocket 313 which, through a chain 314, drives the sprocket 315 on the shaft 124, the latter having a sprocket 316 driving, through a chain 317, the sprockets 187 and 318. The sprocket 318 is mounted on a shaft 320 and, through a spiral gear 321 meshing with a spiral gear 322, drives a shaft 232. On the shaft 320, which is supported in bearing brackets 323 attached to the frame 25, is also mounted a spiral gear 324 meshing with a spiral gear 325 on the shaft 231. The hub of the sprocket 187 carries a sprocket 326 which, through a chain 253, drives the sprocket 254 on the shaft 250. On the rocking arm 256 is loosely pivoted a gripping pawl 327 resting on the gummed strip 241 on the roller 247 some distance beyond its highest point. As the presser roller 242 moves forward with the package, the pawl 327, through the backward motion of the arm 256, clamps the strip 241 to the roller 247 and pulls off a length of strip sufficient for one seal, from the reel 246. The length so pulled off forms a slack in the strip which is taken up by the return motion of the presser roller 242. For making the necessary adjustments in assembling the machine, the drive shaft 47 is provided with a hand wheel 328 for manual operation. The pipe 329 communicating with the suction chamber of the turret 28 is attached by a hose connection 330 to a suction pump, not shown. The operating tables 153 are supported by posts 335 fastened to the frame 25 of the machine.

In view of the foregoing, a detailed description of the operation of the machine is deemed unnecessary, and is therefore omitted.

What is claimed is:

1. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means.

2. The combination with wrapper and article forwarding means, of means for forming and supplying wrappers to said forwarding means in trough-like article-receiving formation with two diagonally opposite corners upstanding and with two diagonally opposite corners outstanding, means for successively folding said corners at a plurality of stations in the path of said forwarding means into superposed position on articles emplaced on wrappers in said forwarding means, and means for sealing the superposed corners.

3. The combination with wrapper and article forwarding means, of means for forming and supplying wrappers to said forwarding means in trough-like article-receiving formation with two diagonally opposite corners upstanding and with two diagonally opposite corners outstanding, means for successively folding said corners at a plurality of stations in the path of said forwarding means into superposed position on articles emplaced on wrappers in said forwarding means, and means for supplying an adhesive seal to the uppermost corner and to the body of each wrapper.

4. The combination with wrapper and article forwarding means, of means for forming and supplying wrappers to said forwarding means in trough-like article-receiving formation with two diagonally opposite corners upstanding and with two diagonally opposite corners outstanding, means for successively folding said corners at a plurality of stations in the path of said forwarding means into superposed position on articles emplaced on wrappers in said forwarding means, and means for enclosing cards in the wrappers with the articles.

5. The combination with wrapper and article forwarding means, of means for forming and supplying wrappers to said forwarding means in trough-like article-receiving formation with two diagonally opposite corners upstanding and with two diagonally opposite corners outstanding, means for successively folding said corners at a plurality of stations in the path of said forwarding means into superposed position on articles emplaced on wrappers in said forwarding means, and means for emplacing cards on the wrappers before articles are emplaced thereon.

6. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said forwarding means including a plurality of wrapper and article supporting pockets, and means for advancing said pockets from station to station.

7. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said forwarding means including a plurality of wrapper and article supporting pockets, means for advancing said pockets from station to station, and means for supporting the outstanding corners of the wrappers during their advancement.

8. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said supplying means including means for bending wrappers into said formation, and means for transferring the bent wrappers to said forwarding means.

9. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said supplying means including means for bending wrappers into said formation, means for supplying wrappers to said bending means, and means for transferring the bent wrappers to said forwarding means.

10. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said folding means including means operative at one station to fold two of said corners into superposed position.

11. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said folding means including means operative at one station to fold two of said corners into superimposed position, and means for so holding said corners as said forwarding means advances.

12. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said folding means including means operative at one station to fold two of said corners into superposed position, and means operative at a second station to inwardly and downwardly fold upstanding parts of the unfolded outstanding corners.

13. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said folding means including means operative at one station to fold two of said corners into superposed position, means operative at a second station to inwardly and downwardly fold upstanding parts of the unfolded outstanding corners, and means operative at a third station to turn upwardly the outstanding corners.

14. The combination with wrapper and article forwarding means, of means for forming and supplying wrappers to said forwarding means in trough-like article-receiving formation with two diagonally opposite corners upstanding and with two diagonally opposite corners outstanding, and means for successively folding said corners at a plurality of stations in the path of said forwarding means into superposed position on articles emplaced on wrappers in said forwarding means, said folding means including means operative at one station to fold two of said corners into superposed position, means operative at a second station to inwardly and downwardly fold upstanding parts of the unfolded outstanding corners, means operative at a third station to turn upwardly the outstanding corners, and means operative at a fourth station to fold the other two corners into superposed position.

15. Means for forming and supplying wrappers to wrapper and article forwarding means in trough-like article-receiving formation with two diagonally opposite corners upstanding and with two diagonally opposite corners outstanding, including means for bending flat wrappers into said formation, and means for transferring the bent wrappers to the forwarding means.

16. Means for forming and supplying wrappers to wrapper and article forwarding means in trough-like article-receiving formation with two diagonally opposite corners upstanding and with two diagonally opposite corners outstanding, including means for bending flat wrappers into said formation, means for supplying wrappers to said bending means, and means for transferring the bent wrappers to the forwarding means.

17. Means for forming and supplying wrappers to wrapper and article forwarding means in trough-like article-receiving formation with two diagonally opposite corners upstanding and with two diagonally opposite corners outstanding, including means for bending wrappers into said formation, a magazine for wrappers in flat form, means for presenting wrappers from said magazine to said bending means, and means for transferring the bent wrappers to said forwarding means.

18. Means for forming and supplying wrappers to wrapper and article forwarding means in trough-like article-receiving formation with two diagonally opposite corners upstanding and with two diagonally opposite corners outstanding, including means for bending wrappers into said formation, a magazine for wrappers in flat form, a turret, means for causing said turret to present wrappers from said magazine to said bending means, and means for transferring the bent wrappers to the forwarding means.

19. Means for forming and supplying wrappers to wrapper and article forwarding means in trough-like article-receiving formation with two diagonally opposite corners upstanding and with two diagonally opposite corners outstanding, including means for bending wrappers into said formation, a magazine for wrappers in flat form, a turret, means for giving said turret elevating and lowering and rotating movements to cause it to present wrappers from said magazine to said bending means, and means for transferring the bent wrappers to the forwarding means.

20. Means for forming and supplying wrappers to wrapper and article forwarding means in trough-like article-receiving formation with two diagonally opposite corners upstanding and with two diagonally opposite corners outstanding, including means for bending wrappers into said formation, a magazine for wrappers in flat form, suction means for presentitng wrappers from said magazine to said bending means, and means for transferring the bent wrappers to the forwarding means.

21. Means for successively folding into superposed position on articles at a plurality of stations the corners of wrappers lying in trough-like formation under articles in forwarding means with two diagonally opposite corners upstanding and with two diagonally opposite corners outstanding, including folding means rotating on an axis parallel with the path of the forwarding means to fold two of said corners into superposed position.

22. Means for successively folding into superposed position on articles at a plurality of stations the corners of wrappers lying in trough-like formation under articles in forwarding means with two diagonally opposite corners upstanding and with two diagonally opposite corners outstanding, including two cam-like folders rotating on an axis parallel with the path of the forwarding means and operating to first fold trailing corners and then leading corners of the wrappers into superposed position.

23. Means for successively folding into superposed position on articles at a plurality of stations the corners of wrappers lying in trough-like formation under articles in forwarding means with two diagonally opposite corners upstanding and with two diagonally opposite corners outstanding, including cam-like folders operative at one station to fold two of said corners into superposed position, and means for so holding said corners as the forwarding means advances.

24. Means for successively folding into superposed position on articles at a plurality of stations the corners of wrappers lying in trough-like formation under articles on forwarding means with two diagonally opposite corners upstanding, including cam-like folders operative at one station to fold superposed corners on the forwarding means.

25. Means for successively folding into superposed position on articles at a plurality of stations the corners of wrappers lying in trough-like formation under articles on forwarding means with two diagonally opposite corners outstanding, including folders operative at one station to fold two corners into superposed position, and means operative at a second station to inwardly and downwardly fold upstanding parts of the unfolded outstanding corners.

26. Means for successively folding into superposed position on articles at a plurality of stations the corners of wrappers lying in trough-like formation under articles on said forwarding means with two diagonally opposite corners upstanding and with two diagonally opposite corners outstanding, including means operative at one station to fold two of said corners into superposed position, and means rotating in planes at right angles to the path of the forwarding means at a second station to inwardly and downwardly fold upstanding parts of the unfolded outstanding corners.

27. Means for successively folding into superposed position on articles at a plurality of stations the corners of wrappers lying in trough-like formation under articles on the forwarding means with two diagonally opposite corners upstanding and with two diagonally opposite corners outstanding, including means operative at one station to fold two of said corners into superposed position, and two pairs of oppositely rotating discs operating in planes at right angles to the path of the forwarding means at a second station to inwardly and downwardly fold upstanding parts of the unfolded outstanding corners.

28. Means for successively folding into superposed position on articles at a plurality of stations the corners of wrappers lying in trough-like formation under articles on the forwarding means with two diagonally opposite corners upstanding, including means operative at one station to fold two of said corners into superposed position, means operative at a second station to inwardly and downwardly fold upstanding parts of the unfolded outstanding corners, and means operative at a third station to turn upwardly the outstanding corners.

29. Means for successively folding into superposed position on articles at a plurality of stations the corners of wrappers lying in trough-like formation under articles on the forwarding means with two diagonally opposite corners upstanding and with two diagonally opposite corners outstanding, including means operative at one station to fold two of said corners into superposed position, means operative at a second station to inwardly and downwardly fold upstanding parts of the unfolded outstanding corners, and means rotating on axes parallel with the path of the forwarding means at a third station to turn upwardly the outstanding corners.

30. Means for successively folding into superposed position on articles at a plurality of stations the corners of wrappers lying in trough-like formation under articles on the forwarding means with two diagonally opposite corners upstanding and with two diagonally opposite corners outstanding, including means operative at one station to fold two of said corners into superposed position, means operative at a second station to inwardly and downwardly fold upstanding parts of the unfolded outstanding corners, means operative at a third station to turn upwardly the outstanding corners, and means operative at a fourth station to fold the other two corners into superposed position.

31. Means for feeding wrappers and cards, comprising a turret provided with suction devices for lifting and carrying wrappers and with impaling devices for lifting and carrying cards, means for raising and lowering said turret, and means for rotating said turret to deliver the wrappers and cards.

32. Means for folding upstanding diagonally opposite corners of a wrapper into superposed position on an article resting on the wrapper, comprising a rotating shaft overlying both corners, and two cam-like folders carried by said shaft and successively engaging said corners.

33. Means for inwardly and downwardly folding upstanding parts of a wrapper at the ends of an enclosed article, comprising a pair of folders at each end of the article, and means for rotating the members of each pair in opposite directions.

34. Means for upwardly turning outstanding corners of a wrapper partially folded about an article, comprising stationary guides, and coacting rotary segments having rollers pressing the corners against said guides.

In testimony whereof, we have signed our names to this specification.

WILHELM B. BRONANDER.
JAMES W. LEARY.